United States Patent [19]

Slater

[11] Patent Number: 5,018,021

[45] Date of Patent: May 21, 1991

[54] INDIVIDUALIZED VIDEO CENTER

[75] Inventor: Daniel Slater, 2320 Westwood La., Palatine, Ill. 60067

[73] Assignee: Daniel Slater, Palatine, Ill.

[21] Appl. No.: 449,980

[22] Filed: Dec. 13, 1989

[51] Int. Cl.⁵ .............................................. H04N 7/167
[52] U.S. Cl. ...................................... 358/349; 380/16; 358/86; 455/4
[58] Field of Search ............... 358/349, 84, 86; 455/2, 455/4; 340/825.06, 825.07; 380/16

[56] References Cited

U.S. PATENT DOCUMENTS

| | | | |
|---|---|---|---|
| 2,918,522 | 12/1959 | Ridenour | 380/16 |
| 3,021,383 | 2/1962 | Mountjoy et al. | 358/84 X |
| 3,192,313 | 6/1965 | Rubinstein et al. | 380/16 X |
| 3,281,695 | 10/1966 | Bass | 380/84 X |
| 4,173,024 | 10/1979 | Miller | 358/349 |
| 4,896,354 | 1/1990 | Inagaki et al. | 380/7 |

Primary Examiner—Linda J. Wallace
Attorney, Agent, or Firm—Charles F. Lind

[57] ABSTRACT

A coin-operated TV system is disclosed that uses separate TV displays or sets, each having an individual coin acceptor, program selector and control. Centralized sources of pre-recorded and/or publicly broadcast programs are provided via TV modulators as separate channels hard wired to every TV set. A computer is also hard wired to every TV control. The computer and TV control provide that each TV set normally receives and exhibits one channel continuously, at no costs. If the program selector at any TV set is switched to another specific channel and the coin acceptor has received a suitable deposit, the computer and TV control shift that particular TV set to the selected channel. The selected channel will operate for a predetermined duration or until the selected program has ended. Thereafter, the TV set will be shifted back to the free channel, unless a different specific channel had earlier been selected and paid for. The pre-recorded program can last only 3-5 minutes each, to encourage frequent reuse of the TV system, and many related programs can be grouped on a laser disc for allowing approximately one hour of continuous programming.

19 Claims, 3 Drawing Sheets 5,018,021

INDIVIDUALIZED VIDEO CENTER

BACKGROUND OF THE INVENTION

Many businesses, such as bars, barber shops, etc., have a TV set or several TV sets placed for free viewing by the business patrons. Public places, such as airport waiting rooms, etc., also have TV sets placed for free patron viewing; although some places may alternatively mount small coin-operated TV sets that a viewer can pay for and watch privately. Generally, such TV sets carry only conventional publicly broadcast programming, be it over the public airwaves or by cable.

Patrons of many other business places might also find it enjoyable to view TV sets or displays, but the business owner cannot foresee sufficient benefits to overcome the costs of providing the needed equipment.

SUMMARY OF THE INVENTION

This invention relates to and a general object of this invention is to provide a TV system having a common or central signal generating unit, and a plurality of coin-operated TV sets or displays hard wired to the signal generating unit. The TV sets are remotely spaced from one another and the signal generating unit, suited for substantially private viewing, such as in a private business or in public place, and have efficient modes of operation to appeal to both an installing owner and a viewing patron.

A specific possible place of use of this invention might be in a restaurant or related business establishment, having individual tables or booths therein.

To achieve this and other objects, the present invention may have, at spaced private locations such as the individual tables or booths, separate TV sets or displays each having suitable individual coin-accepting and selector controls, and having a common signal generating or reproducing unit located in the restaurant office or the like, and having hard wiring connecting the common unit and each TV set. The common signal generating of broadcasting unit is suited to provide pre-recorded or private programming and conventional publicly broadcast programming, that can be viewed at the individual TV set only after the appropriate monetary payment and program selection have been made.

Specifically suited pre-recorded programming might include music videos, each of which may last for perhaps 3-5 minutes, to encourage a high turnover rate and greater system income. Cartoons commonly packaged in 3-5 minute segments could also be used. Other programming formats that could likewise be packaged in short 3-5 minute segments, and be received equally as well, might include classic comedy skits, sports highlights, etc., to name but a few.

BRIEF DISCRIPTION OF THE DRAWINGS

Further objects, advantages and features of the present invention will appear from the following disclosure and description, including as a part thereof the accompanying drawing, in which.

DETAILED DESCRIPTION OF ILLUSTRATED EMBODIMENTS

Figure 1:
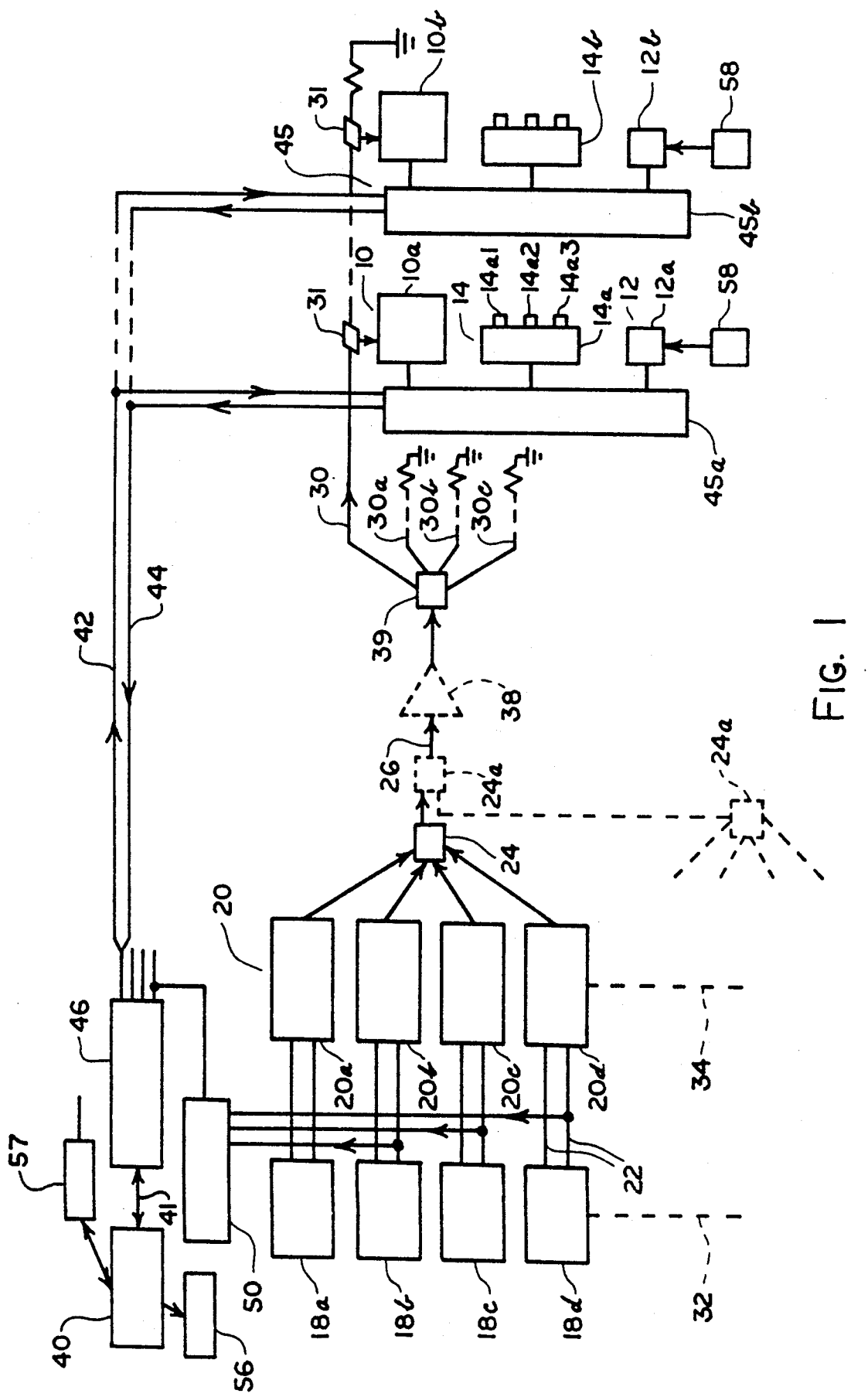
FIG. 1 is a schematic of the components and operating circuit used in the invention.
Figure 2:
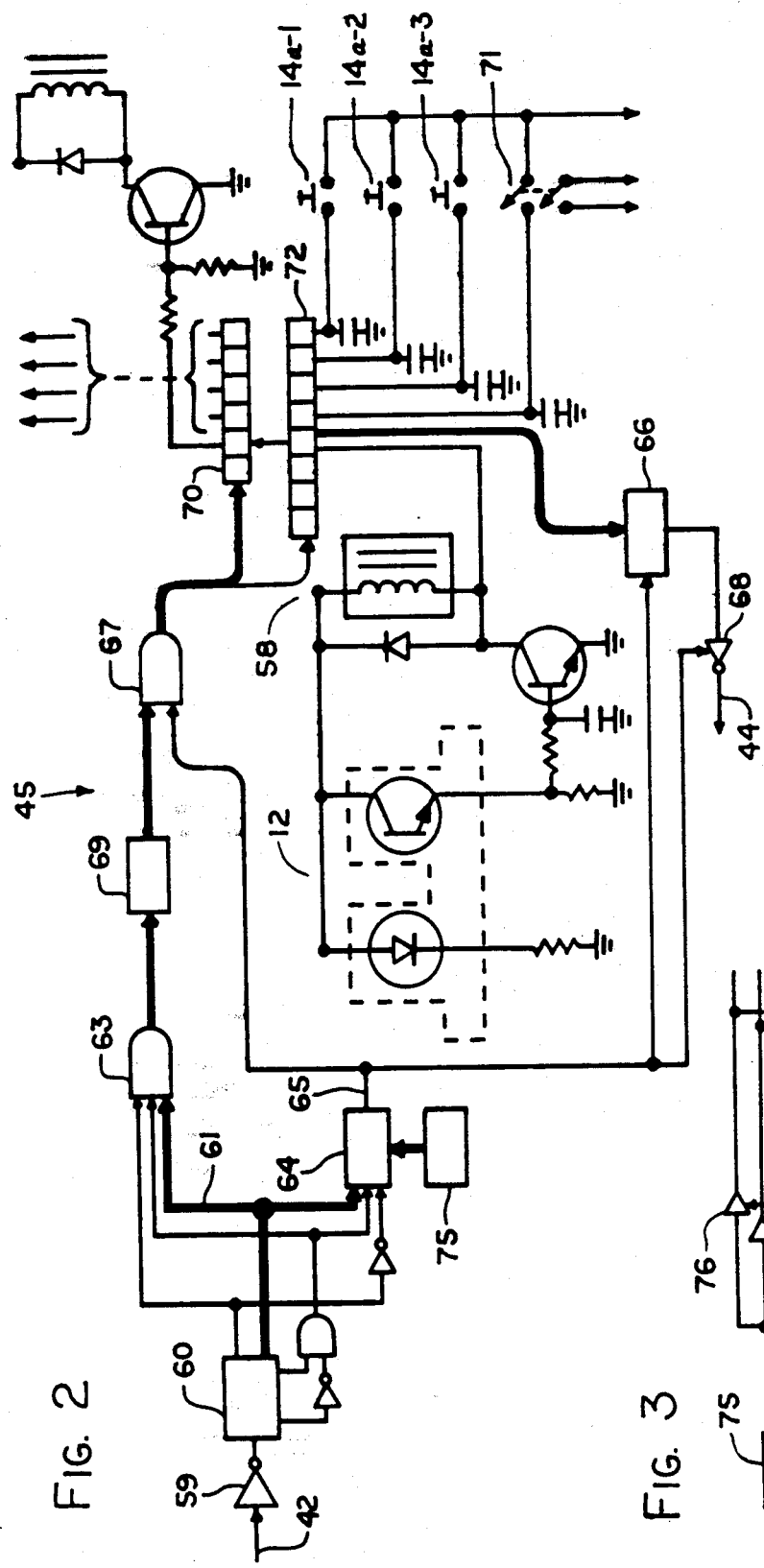
FIGS. 2 and 3 are schematics of more detailed components and operating circuits used in the invention.
Figure 3:
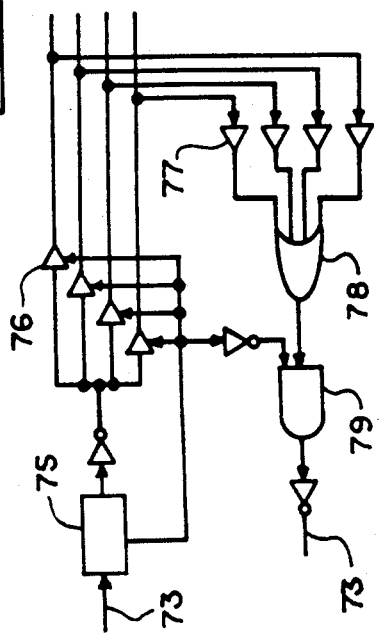

The components illustrating the TV system to be disclosed herein can be of conventional construction, and therefore are shown in FIGS. 1, 2 and 3 in a block or schematic format. A number of TV set or displays (generally identified as 10 and individually identified as 10a and 10b) are illustrated, and a coin acceptor (again generally identified as 12 and individually identified as 12a and 12b) is connected operatively to each TV set 10. A selector (again generally identified as 14 and individually identified as 14a and 14b) is also associated with each TV set or display 10; and in a preferred embodiment, each selector will have several separate actuator buttons for making different selections, although only actuator buttons 14a-1, 14a-2 and 14a-3 are illustrated for the selector 14a.

A control unit (generally identified as 45 and individually identified as 45a and 45b, see FIG. 2) will be associated with each TV set or display 10 and its coin acceptor 12 and selector 14, and its construction and operation will be more fully explained later. It is contemplated that all of these components, the TV set 10, coin acceptor 12, selector 14 and control unit 45 will be contained in a single housing, having a lockable door to provide secured access to the components and for emptying the coin acceptor 12 or otherwise servicing the components. It will be appreciated that in a typical system, such TV sets will be placed locally for individual viewing, such as at separate tables or booths of a restaurant.

The TV system further includes means for providing signals for different programs, and TV modulators are associated with such program producing means suitable for transmitting or sending the signals for the separate programs. This is illustrated in FIG. 1 as separate program source blocks (again generally identified as 18 and individually identified as 18a, 18b, 18c and 18d) representing the separate programs, and TV modulators (again generally identified as 20 and individually identified as 20a, 20b, 20c and 20d) connected or hard-wired by conductive lines 22 to the program sources 18.

In one mode of operation, the program source blocks 18 may take the form of audio/video reproducing or signal generating means, such as a video laser disc, video tape or the like. In an alternative mode of operation, the program source block 18 may include publicly broadcast programming transmitted over the public airwaves, satellite dishes, cable or the like. The outputs from the TV modulators 20 are directed via a combiner 24, feed lines 26 and 30, and tapoffs 31 to the TV sets or monitors 10.

The number of separate program sources 18 and TV modulators 20 can of course be varied, as by adding more in a similar manner as indicated respectively along the phantom lines at 32 and 34. Similarly, the outputs from such additional TV modulators could be directed via a second combiner (as illustrated in phantom at 24a connected in series with combiner 24 in the line 26) to accomodate the additional program signals. If necessary, an amplifier 38 can be included in the feed lines 26 and 30 to amplify the output signals before being directed to the TV sets 10.

In practice, possibly twenty separate TV sets 10 might be on any one feed line 30. If additional TV sets 10 are needed, a signal splitter 39 may be interposed in the feed line 26, thereby providing separate feed lines 30, 30a, 30b and 30c, each carrying the program signals for the additional TV sets (not shown).

The TV modulators 20 can take the form of a conventional CATV television modulator, each illustrated TV modulator 20a, 20b, 20c and 20d representing a channel suitable for separate program transmission on the television system. The modulator channels might be chosen specifically for use in each geographical area to avoid all existing or allowable local broadcast channels, and where possible being spaced several channels away from the regular local channels. If additional television channels are required to accomodate the number of separate program sources 18, one or more of the TV modulators 20 may be used on midband cable channels (between channels 6 and 7) or on superband or hyperband cable channels (above channel 13).

A suitable control is provided, such as in the form of a computer 40, which is hard wired via lines 42 and 44 and interface 46 to the control unit 45 for each of the previously-mentioned TV sets or displays 10, coin acceptors 12, and selectors 14.

The computer 40 will operate to tune each TV set to receive one program source or channel (18a as illustrated herein) when no specific different program channel has been selected and paid for. This dominant program channel most commonly will be free, and contain suitable commercial ads or the like beneficial to the operator of the system and/or local merchants.

The computer 40 further would respond to the combined occurence of both a suitable coin having been deposited in any coin acceptor 12 and a proper program selection having been made with the corresponding program selector 14. When both conditions occur, the computer 40 will provide for the one activated TV set to tune to the selected program channel.

The selected programs offered at the different channel sources 18b, 18c and 18d illustrated might be selected as short segments from different popular categories to suit the interests of different people. Examples of such programs might include for example rock or pop videos shown on one channel, great moments in sports shown on another channel, and kids cartoons or classic comedy skits or the like shown on another channel. Additionally or alternatively, one or more of the program sources may be live commercial broadcasting, such as of a news and/or movie channel.

With this general format, the different programs of the same type may be arranged sucessively, each lasting 3–5 minutes for example with a short lead-in gap of several seconds or so between the consecutive programs. A closed circuit signal generating means, such as a laser disc player, video tape or the like, could be used to incorporate such a series, each possibly having 10–20 separate programs. The closed circuit signal generating means might be run continuously, with the separate programs automatically being presented consecutively, so that each series might last an hour or so. The same disc or tape may be replayed, or a new disc or tape may replace that just shown.

A general mode of operation might be to charge for viewing time of any "selected" program channel, but to give the viewing patron no selection of any specific program in the series of a "selected" program channel. This would allow random viewing of the selected program series on that channel.

One manner of controlling the viewing of the programs might be based solely on a timed duration, such as possibly 3-10 minutes for each paid period. This may be provided by having the computer 40 time the paid duration and then automatically switch the TV set from the paid channel to the free program channel, for subsequent viewing on that TV set.

However, this timed approach means that except for a very short duration of only a few seconds or so (between the sucessive programs), one would rarely ever catch the beginning of a selected program, but most of the time would initially see the conclusion of one program and the beginning of a second program; but not a single complete program. This might be compensated for somewhat by allowing the paid duration to run perhaps half again or so longer than the length of an average single program, thereby increasing the odds (but not guaranteeing) that at least one complete program may be viewed.

In order to overcome this, an end-of-program dectector 50 may be provided for each paid program channel, but not for the free program channel, and connected to the computer 40 via the interface 46. This might be done by imposing subsonic or supersonic signals on the pre-recorded closed circuit signal generating means at the end of each program, sensing these signals, and then sending a control signal to the computer.

The computer 40 might be set to require that the ends of two programs be detected before shifting the selected program channel on the TV set. With this sequence, a viewer would see the conclusion of any program already in progress and the complete subsequent program.

To make the disclosed system more useful to the business owner or manager, the computer 40 may count the individual programs selected on each of the separate TV sets and maintain a cumulative count of this; and further may determine the specific frequency of use of each of the TV sets. With this stored information available, the program selections offered could be changed to provide greater overall appeal and usage of the system, or to rearrange the locations of the TV sets.

A printer 56 may be connected to the computer 40 suitable for printing this information in a report fashion so that a daily accounting can be maintained of the revenue, specific TV set usage and program channels selected. A modem 57 may further transmit this data over the telephone lines to a central office for overall control of the system.

The individual coin acceptor 12 at each TV set 10 would have to be emptied separately. A locked access door (not shown) could be provided to the housing unit generally and/or to the coin acceptor specifically for this purpose. A coin counter 58 associated with each coin acceptor 12 may verify the revenue intake as detected and recorded by the computer 40, and this coin counter again can be of a conventional construction.

A more detailed illustration of the control unit 45 associated with each TV set 10, coin acceptor 12 and selector 14 is illustrated in FIG. 2, using electronic signal generating, transmitting and receiving equipment of conventional design.

The line 42 from the computer interface 46 may be directed through an inverting amplifier 59 to a serial to parallel receiver 60. The serial to parallel receiver 60 is connected via multiple-conductor line 61 to gate 63 and comparator 64. The comparator 64 output line 65 is directed to parallel to serial transmitter 66, to gate 67 and to tri-state inverting driver 68; and the gate 63 output is directed via multiple-conductor lines and temporary register 69 and gate 67 to command register 70, and from the gate 67 via a single conductor line to reply register 72. The command register 70 may be suited to store six bits of information while the reply register 72 may be suited to store eight bits of information. The output line 44 of the tri-state inverting driver 68 is connected back to the computer interface 46.

An internal selector switch 75 may be connected via a multiple-conductor line operable to set a unique address for the comparator 64, and thus provide that each separate control unit 45 has a unique address. The address selector switch 75 may be made up of two 10-position BCD-encoded rotary switches with only the low order 7 bits used. With them, a seven bit address can provide eighty valid addresses, from "00" through "79". This would be easier to use than a hexadecimal rotary switch or a 7-bit binary DIP switch, though each of these would allow 128 addresses.

The coin acceptor 12 may be of a conventional form, having means for detecting a coin and having means for transmitting a signal responsive thereto. The coin acceptor 12 is connected to both the reply register 72 and to the command register 70, to input its signal as one bit in each.

A coin lockout device (not shown) can be used to prevent the rapid successive deposits of coins into each coin acceptor 12, so that if the computer 40 were operating too slowly, the second coin might go undetected. An appropriate coin lockout circuit 81 is illustrated suited to trigger the actual lockout device responsive to the output signal of the coin acceptor 12.

The individual selector switches 14a-1, 14a-2 and 14a-3 are connected to respective bits in the reply register 72 (three bits being illustrated to correspond to the three paid program channels illustrated).

The access door to the housing containing the coin acceptor 12 and control unit 45 may operate switch 71, to provide a signal responsive to the door being opened; and the switch is connected to one bit in the reply register 72.

An alternate system may use a single cable 73 in place of the two lines 42 and 44) to provide the computer communications, and a suitable circuit is illustrated in FIG. 3. The circuit includes a universal asynchronous receiver transmitter (UART 75) connected to the required number of separate line drivers 76 to feed the number of separate control units 45 used in the system, where these line drivers would be of the tri-state type (having high, low and disconnected modes). The UART unit 75 would provide outgoing signals via the illustrated tri-state drivers 76, and both these and the incoming signals would be received via appropriate amplifiers 77 and a combiner or summer 78 connected back to the computer interface 46 via gate 79. This will result in a one byte delay in the transmitted data, requiring the same time as a four byte signal, while actually only communicating the three data bytes (the command, the address, and the reply). The gate timing maintains a separation of the computer outgoing and incoming signals.

The single cable computer communication can further be operated on the TV-RF distribution system if the following precautions are taken. The computer data must be connected to the line through small inductors; the RF connections must be through small capacitors; all taps of the data must pass DC current; the line termination must be capacitor isolated; and any RF amplifiers must be bypassed (input to output) with inductors, and must be isolated from the line with series capacitors.

Also, the single bus requires that each reply byte must always contain a command bit, so that it can never be interpreted as an address byte. In most applications, a single bus-type system could probably be added onto the television RF distribution system without causing objectionable interference. Audio or RF modems could also be used, but with additional equipment and expense.

SUMMARY OF THE OPERATION OF THE INVENTION

Each control unit 45 in the system will be identified by its unique address, and the computer 40 will poll each control unit 45 in a manner to be noted. This polling will be repeated sequentially for all of the control units 45 to complete one polling cycle, and such polling cycles will be repeated continuously so long as the system is in operation. Depending on the number of separate TV displays in the system and the speed of the computer used, each complete polling cycle may take between tens of milliseconds and perhaps several seconds.

The polling may comprise the computer 40 sending out on line 42 two bytes of information consisting of a command byte first and then an address byte. Each control unit 45 will receive both bytes, but only the control unit associated with that address will take action. The data in the reply register 72 of that control unit will then be transmitted back to the computer 40, via line 44. The computer 40 in turn will receive this data and act on it or store it until the next polling.

The command byte may comprise seven bits, and may be passed via the gate 63 and stored in the register 69 temporarily until the address byte is received in the comparator 64. When the address match between the specific address byte and address selector switch 75 is improper, the signal in the temporary register 69 is ignored; whereas when the address match is proper, the gate 67 is opened and the line driver 68 is enabled.

The opened gate 67 allows the signal in the temporary register 69 to be passed on to the command register 70 and to the reply register 72. In the system illustrated, six bits are loaded into the command register 70, and the seventh bit is directed to the reply register 72 to clear the register when deemed appropriate by the computer 40.

The command register 70 provides a continuous signal to the tuner control of the TV set 10, operable to tune the TV set to one of the program channels; and possible also to power an indicator light at the appropriate selector actuator button 14a-1, 14a-2 or 14a-3 corresponding to that channel.

The enabled line driver 68 allows the signal in the reply register 72 to be transmitted back to the computer 40.

When the system is first energized, and also specifically when no coin has been detected and/or no program selection has been made for any particular TV set, the computer 40 will be set up to provide that the command byte will include one bit instructing each control unit to tune its TV set to the free program channel. Thus, without any offsetting inputs, the TV sets will be exhibiting the free program channel.

The signal from the coin acceptor 12, upon detecting the presence of a coin, is stored as one bit in the reply register 72. The input signal from an actuated program selector switch 14a-1, 14a-2 or 14a-3 will be directed to a correcponding specific bit in the reply register 72

(three bits being illustrated to correspond to the three paid program channels illustrated). The housing access door signal via switch 71 will also provide a specific bit to the reply register 72.

The data in the reply register 72 is transmitted to the computer 40, and the computer in turn takes the appropriate action, which may be to shift the channel of that particular TV set, immediately or on the next polling of the control unit. In effect, data in the reply register 72 will form part of the command byte for the next polling, specifically including the selected program channel bit.

Data from each polled control unit 45 will be retained in the computer 40 at least until the next subsequent polling, specifically including the selected program and the paid duration. Subsequent command signals directed to a particular control unit may well be merely duplicated, so that the selected program channel will continue to be shown on the TV set.

Other information likewise stored in the computer 40 will include the end of program data for each operating control unit and its selected program channel. As noted, this may be on a timed basis or responsive to a specific end of program signal, as might be used in the system.

A control unit similar to that illustrated herein can be provided to handle the detected end of program signals, having a reply register to receive separate bits of data, one for each separate program channel. One control unit would easily handle the three detector signals needed with the three illustrated separate program channels (and could possibly handle up to seven separate program channels, one register bit for each channel signal). The end of program control unit would have a unique address, and it would be polled by the computer 40, just as though it were another control unit 45.

The end of program and/or timed out signal would be retained by the computer 40 in the data specific for an appropriate control unit 45 exhibiting that particular program channel, effective automatically to change the next command byte for that control unit necessary to switch the program channel back to the free program channel or to a subsequently paid-for and selected program channel.

The opened access door signal via switch 71, which might suggest that the coin acceptor was being emptied, might be used for accounting and/or security purposes, to advise of the time and duration of each occurance. This control signal might also be used to bypass the coin acceptor signal control, as during servicing, to allow selection of the different program channels at its TV set without actually depositing coins into the acceptor 12.

In practice, up to possibly twenty separate control units 45 might be on any one set of communication lines 42 and 44. If additional control units are used, additional sets of the communication lines 42 and 44 may be provided, where four sets of such lines would handle the approximate eighty separate TV sets that might be contemplated in the disclosed system. Data could be sent per EIA standard RS-232C, except using drivers 68 of a tri-state mode.

When actuated, the coin lockout control will be effective for only a short duration, such as one or possibly several polling cycles. Thus, possibly several seconds after a first coin has been deposited, the deenergized lockout control will allow a second coin to be deposited for setting up sequential program selections.

As the computer 40 provides for the sequential control for the system, convenient field modifications of the overall operation may be made, based on changes of the software only. This form of control will even allow a remotely located master computer to download new software into the local computer, via a telephone modum hookup to the local computer 40. This feature would appeal to the supplier of the overall system, having such a master computer at its headquaters or the like.

Figure 4:
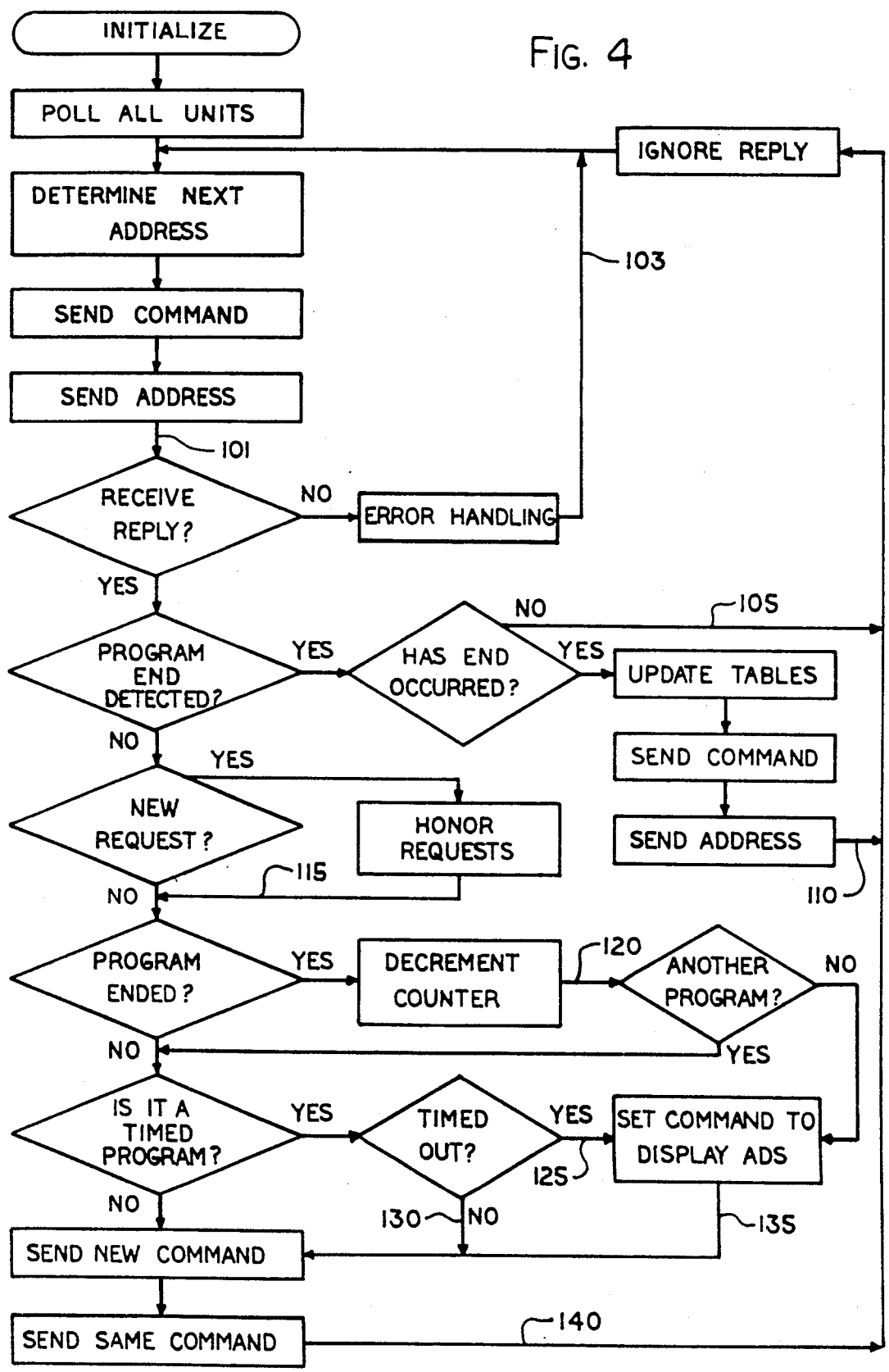
FIG. 4 is a flow chart of the related computer use in the invention.

A flow chart of related computer functions as used in the invention is illustrated in FIG. 4. This illustration includes the polling sequence at 101 of generating and transmitting the command and address bytes, and receiving the reply byte, including loop 103 handling possibly erroneous or missing replys from the separate control units. The illustrated loops 105 and 110 provide the polling sequence for the end of program detectors for the separate channels, and updating this information as might be needed for the specific control units. The loop 115 updates the command byte information, for subsequent transmission to the specific control units. The loop 120 services the end of program condition, loop 125 services the program timed-out condition, and loops 130 and 135 respectively continue or change the program channel control. The loop 140 handles the transmission of the updated command and address bytes.

This control can be varied, such as in the sequence of operation, or can be made to require a certain redundency of polling to overcome possible transmission errors. Notwithstanding slight modifications, the overall operation of the disclosed system will have its appeal and advantages.

While only specific embodiments of the invention have been illustrated, it is apparent that variations may be made therefrom without departing from the inventive concept. Accordingly, the invention is to be limited only by the scope of the following claims.

What is claimed as my invention is:

1. A coin-operated TV system, comprising the combination of
    separate TV sets, and an individual coin acceptor and program selector control for each TV set;
    means providing signals for a plurality of separate programs and TV modulator means for transmitting said signals for the separate programs on separate channels;
    each TV set being spaced from the signal providing means and the TV modulator means and being located remote from each other and placed locally for individual control and viewing;
    a control means for operating each separate TV set responsive to specific conditions of its respective coin-acceptor and program selector control;
    a computer, and means hard wiring the computer and control means together;
    said computer and control means being operable, when the coin acceptor for any particular TV set has not received a suitable deposit or when the selector control for that particular TV set has not been set to receive the signals for any particular program, to connect the channel transmitting the signals for one of the programs to that particular TV set;
    said computer and control means being operable, when the coin-acceptor for any particular TV set has received a suitable deposit and when the selector control for that particular TV set has been set to receive the signals for a particular program, to connect the channel transmitting the signals for that particular program to that particular TV set; and said computer and control means being operable, after the duration paid for at the particular coin acceptor has terminated, to terminate the connection of the signals for the selected particular program to that particular TV set and to then direct either the signals of a properly paid for and subsequentially selected particular program or of the said one program to that particular TV set.

2. A coin-operated TV system according to claim 1, further wherein the means providing signals for a plurality of separate programs include a closed circuit signal source means for providing at least the said one program.

3. A coin-operated TV system according to claim 2, further including the closed circuit signal source means being in the form of a laser disc player. player.

4. A coin-operated TV system according to claim 1, further including the means providing signals for a plurality of separate programs being a closed circuit signal source means for providing at least the said one program and at least another program.

5. A coin-operated TV system according to claim 4, further including the closed circuit signal source means being in the form of a laser disc player.

6. A coin-operated TV system according to claim 1, further including the means providing signals for a plurality of separate programs including both a closed circuit signal source means to provide private programs including specifically at least the said one program and conventional TV reception means to provide publicly broadcast programming.

7. A coin-operated TV system according to claim 6, further including said computer and control means being operable to count the separate and cumulative deposits made into each coin acceptor, and to count the separate and cumulative selections made on each selector control.

8. A coin-operated TV system according to claim 1, further including said computer and control means being operable to count the separate and cumulative deposits made into each coin acceptor, and to count the separate and cumulative selections made on each selector control.

9. A coin-operated TV system according to claim 1, further including said separate programs being of short durations each lasting 3-5 minutes and with a gap of several seconds between the consecutive programs, means for detecting the end of each program and generating a signal responsive thereto, and means communicating the end of program signal to the computer so that the computer and control means shifts the TV set to receive a channel transmitting another program.

10. A coin-operated TV system according to claim 1, further wherein said means providing signals includes closed circuit broadcasting means in the form of separate laser disc players, and each laser disc adapted to be used thereon has 10-20 separate programs; and the closed circuit broadcasting means being run continuously, so that each disc provides signals over an extended duration of approximately an hour.

11. A coin-operated TV system according to claim 1, further including said means providing signals including closed circuit broadcasting means in the form of separate laser disc players, each laser disc adapted to be used thereon having 10-20 separate programs of short durations each lasting 3-5 minutes and with a gap of several seconds between the consecutive programs, so that each disc provides signals over an extended duration of approximately an hour, the closed circuit broadcasting means being run continuously, means for detecting the end of each program and generating a signal responsive thereto, and means communicating the end of program signal to the computer so that the computer and control means shifts the TV set to receive a channel sending another program.

12. A coin-operated TV system according to claim 11, further wherein said closed circuit broadcasting means provide at least said one program, and wherein said means providing signals also includes conventional TV receiver means to provide publicly broadcast programming.

13. A coin-operated TV system according to claim 11, further including said computer and control means being operable to count the separate and cumulative deposits made into each coin acceptor, and to count the separate and cumulative selections made on each selector control.

14. A coin-operated TV system according to claim 1, further including each control means being identified by its unique address, and having command register means and reply register means; the individual coin acceptor and program selector control for each TV set being operatively connected to the reply register means associated with that TV set; the command register means being operatively connected to the TV set and the reply register means being operatively connected to the computer; and the computer being operable to poll the control means sequentially and repeatedly, by sending out two bytes of information consisting of a command byte first and then an address byte, and then receiving a reply byte; each control means receiving both bytes, but only the control means associated with that address taking action by transmitting the command byte to the command register means and by transmitting the reply byte in the reply register means back to the computer.

15. A coin-operated TV system according to claim 14, further wherein the computer retains the data polled from each control means at least until the next subsequent polling, and transmits said data as the command byte to said particular control means on the next polling.

16. A coin-operated TV system, comprising the combination of separate TV sets, and an individual coin acceptor and program selector control for each TV set;

means providing signals for a plurality of separate programs and TV modulator means for sending said signals for the separate programs on separate channels;

each TV set being spaced from the TV modulator means and remote from each other and placed locally for individual control and viewing;

a control means for operating each separate TV set responsive to specific conditions of its respective coin-acceptor and program selector control;

a computer, and means hard wiring the computer with the separate control means;

said computer and control means being operable to connect the signals for any of the respective separate programs to any of the respective TV sets, responsive to both the coin acceptor for that particular TV set having received a suitable deposit and the selector control for that particular TV set having been set to the channel sending that particular program;

said separate programs being of short durations each lasting 3-5 minutes with a gap of several seconds between consecutive programs, means for detecting the ends of each of the programs and generating a signal responsive thereto, and means communicating the end of program signal to the computer so that the computer and control means shifts the TV set to receive a channel sending another selected program.

17. A coin-operated TV system according to claim 16 further wherein said means providing signals includes closed circuit broadcasting means in the form of separate laser disc players, and each laser disc adapted to be used theron has 10-20 separate programs; and the closed circuit broadcasting means is run continuously, so that each disc provides signals over an extended duration of approximately an hour.

18. A coin-operated TV system, comprising the combination of separate TV sets, an individual coin acceptor and program selector control for each TV set;

means providing signals for a plurality of separate programs and TV modulator means for sending said signals for the separate programs on separate channels;

each TV set being spaced from the TV modulator means and remote from each other and placed locally for individual control and viewing;

a control means for operating each separate TV set responsive to specific conditions of its respective coin-acceptor and program selector control;

a computer, and means hard wiring the computer with the separate control means;

said computer and control means being operable to connect the signals for any of the respective separate programs to any of the respective TV sets, responsive to both the coin acceptor for that particular TV set having received a suitable deposit and the selector control for that particular TV set having been set to the channel sending that particular program;

each control means being identified by its unique address, and having command register means and reply register means; the individual coin acceptor and program selector control for each TV set being operatively connected to the reply register means associated with that TV set; the command register means being operatively connected to the tuner control of the TV set and the reply register means being operatively connected to the computer; and the computer being operable to poll the control means sequentially and repeatedly, by sending out two bytes of information consisting of a command byte first and then an address byte, and then receiving a reply byte; each control means receiving both bytes, but only the control means associated with that address taking action by transmitting the command byte to the command register means and by transmitting the reply byte in the reply register means back to the computer.

19. A coin-operated TV system according to claim 18, further wherein the computer retains the data polled from each control means at least until the next subsequent polling, and transmits said data as the command byte to said particular control means on the next polling.

* * * * *

UNITED STATES PATENT AND TRADEMARK OFFICE
CERTIFICATE OF CORRECTION

PATENT NO. : 5,018,021
DATED : May 21, 1991
INVENTOR(S) : Daniel Slater, et al.

It is certified that error appears in the above-identified patent and that said Letters Patent is hereby corrected as shown below:

Title page, item (75), second inventor should read--
Roger M. Falk--.

Signed and Sealed this

Eighth Day of December, 1992

Attest:

DOUGLAS B. COMER

*Attesting Officer*   *Acting Commissioner of Patents and Trademarks*